Oct. 19, 1943.     L. C. HUFF     2,332,150
SEAL FOR PUMPS, MIXERS, AND THE LIKE
Filed July 13, 1942
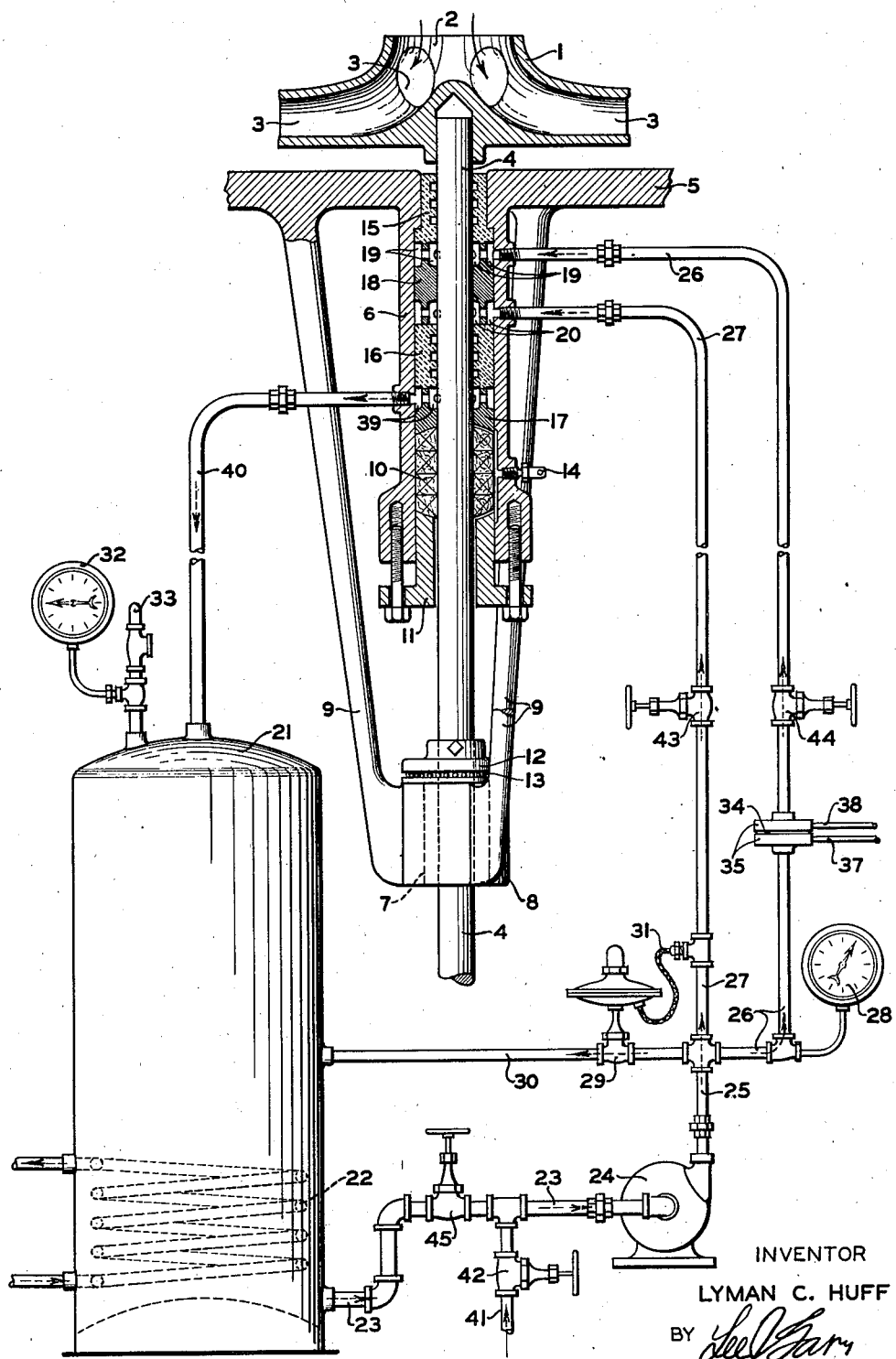
INVENTOR
LYMAN C. HUFF
BY
ATTORNEY Patented Oct. 19, 1943

2,332,150

UNITED STATES PATENT OFFICE 2,332,150

SEAL FOR PUMPS, MIXERS, AND THE LIKE

Lyman C. Huff, Chicago, Ill., assignor to Universal Oil Products Company, Chicago, Ill., a corporation of Delaware Application July 13, 1942, Serial No. 450,810

1 Claim. (Cl. 286—19)

The invention relates to an improvement in apparatus of the class of rotary or centrifugal pumps, mixers, contactors and the like and particularly to apparatus of this class designed to handle hot and/or corrosive fluid at superatmospheric pressure. More specifically, the invention is directed to means for preventing the leakage of hot and/or corrosive fluid from the pumping or mixing chamber of such devices past the packing for the impeller shaft. As applied to pumps, mixers and the like for hot fluid, the invention also provides means for keeping the impeller shaft, stuffing box and packing relatively cool.

To illustrate the features of the invention and its utilities and advantages, the subsequent description is directed principally to one specific form of the apparatus provided by the invention which is designed to handle both relatively hot and highly corrosive fluid at substantial superatmospheric pressure. However, the apparatus is not limited to use under all of these adverse conditions and certain features thereof involving less than the entire combination disclosed will be found advantageous under less severe conditions of service.

The specific form of apparatus herein illustrated and described is designed for use in an alkylating process for reacting saturated and unsaturated hydrocarbons and employing hydrogen fluoride as a catalyst or alkylating agent. In this type of process it is necessary to thoroughly mix the reactants with the alkylating agent in a reaction zone which is operated at elevated temperature and at relatively high superatmospheric pressure. The concentrated hydrogen fluoride employed as the alkylating agent is highly corrosive to most metals and packing materials and one of the most difficult and troublesome problems encountered in the construction and operation of pumps for hydrogen fluoride and mechanical mixing devices for intimately contacting the hydrogen fluoride with the hydrocarbon reactants in the reaction zone is that of maintaining a tight seal about the shafts of the pumps and mixers and preventing attack of the shaft, packing and stuffing box by the hydrogen fluoride.

The difficulty above mentioned is obviated in the apparatus of the present invention by providing an elongated stuffing box about the shaft with the packing material disposed at the end thereof most remote from the impeller and by providing separators or pressure breakdown members about said shaft in the stuffing box at spaced points intermediate the packing and the impeller, with means for introducing relatively cool non-corrosive fluid into a space provided between said breakdown members at a higher pressure than that employed in the pumping or mixing zone. The breakdown members permit the restricted flow of this relatively cool, non-corrosive fluid between the same and the shaft in opposite directions from said space. A portion of the relatively cool non-corrosive fluid is thus supplied from said space between the surface of the shaft and the breakdown member adjacent the impeller into the pumping or mixing zone, while another portion thereof flows from said space between the surface of the shaft and the breakdown member adjacent the packing into another space provided therebetween, wherefrom it is discharged preferably to a suitable storage tank or reservoir from which it is again supplied under pressure to the first named space. When desired, the first named space may be divided by suitable partitioning means provided therein between the shaft and the wall of the stuffing box into separate zones to which separate portions of relatively cool non-corrosive fluid are supplied, the separate portions flowing in opposite directions between the shaft and the adjacent breakdown members, as above described.

It will be apparent that in this improved form of apparatus the packing is isolated from contact with the hot, corrosive fluid handled by the impeller, coming in contact only with the relatively cool non-corrosive fluid which flows past the breakdown member adjacent the packing. This greatly simplifies the problem of packing the shaft and permits the use of readily available packing materials which would not otherwise be suitable for this class of service. Also, the stuffing box and its internal parts are protected from contact with the hot corrosive fluid and seepage of the latter along the shaft into the stuffing box is prevented by the positive flow of the non-corrosive fluid along the shaft in the opposite direction.

The aforementioned and other features and advantages of the invention will be apparent with reference to the accompanying diagrammatic drawing and the following description thereof.

The drawing is an elevational view, shown partially in section, of an apparatus incorporating the features of the invention.

Referring to the drawing, the apparatus here illustrated comprises a rotary impeller 1 to which the fluids to be mixed are supplied through inlet port 2 and wherefrom they are discharged through the outlet ports 3 into a main body of said fluid, not shown, which surrounds the impeller. The impeller is mounted on shaft 4 through which it is driven by a motor or any other suitable motivating means, not illustrated.

A portion of the wall of a confined mixing zone within which impeller 1 is disposed, as indicated at 5, and a cylindrical member 6 integral with or suitably secured to wall 5 comprises a stuffing box through which shaft 4 extends from the impeller to a suitable outboard bearing 7 within which shaft 4 is journalled. The bearing 7 is housed in a suitable supporting member 8 attached by legs 9 to wall 5. A flanged collar 12 is provided on shaft 4 adjacent member 8 and a thrust bearing 13 is provided between members 12 and 8. Packing 10 is provided about shaft 4 within member 6 adjacent the outer end of the latter and a packing gland or follower 11 adjustably bolted, as indicated, to member 6 is provided for compressing the packing. A suitable fitting, indicated at 14, for supplying solid lubricant to the packing and shaft is provided on member 6 or a pressure oiler for liquid lubricant may be substituted.

A member 15 relatively closely fitted about shaft 4, but permitting the restricted flow of fluid between its inner surface and the shaft, is provided at that end of member 6 adjacent the impeller. The restriction to flow along the shaft past this member is sufficient to cause a considerable drop in the pressure of the flowing fluid from one end of member 15 to its opposite end and, for the sake of convenience, this type of element will be hereinafter termed a "pressure breakdown member." A similar pressure breakdown member, indicated at 16, is provided between the packing and member 15 and spaces are provided within member 6 about the shaft between members 15 and 16, and between member 16 and the packing. A spacer 17 is disposed in the space provided between the packing and member 16 and a spacer 18 is provided in the space between members 15 and 16. Preferably, member 18 is closely fitted at its mid-portion to the shaft and to the inner surface of member 6 so that it forms an effective partition dividing the space between members 15 and 16 into separate zones 19 and 20.

The fluid employed for preventing leakage about shaft 4 from the mixing zone into the stuffing box is non-corrosive or materially less corrosive than the main body of fluid handled by the impeller and is stored preferably at relatively low temperature in a closed vessel 21. This fluid may comprise any material of a relatively non-corrosive nature which will not adversely affect the reaction to be conducted in the mixing zone when commingled in relatively small quantities with the reactants undergoing treatment therein. It may, for example, comprise a regulated quantity of one of the reactants or a mixture of two or more of the reactants without the corrosive ingredients of the reacting mixture. Thus, as applied to the alkylation of iso-butane with butylenes, for example, it may comprise iso or normal butane, or a mixture thereof, or butylenes or a mixture of butanes and butylenes, but will not contain the alkylating agent. This fluid is preferably employed in liquid state and when, as in the case of butanes or butylenes, it is gaseous under atmospheric conditions, I preferably employ means for maintaining this fluid in liquid state. In the case illustrated, a closed coil 22 is provided within vessel 21 and a suitable cooling medium is circulated through the coil at the temperature and rate required to keep the fluid in essentially liquid state.

Liquid is directed from the lower portion of the body thereof maintained in vessel 21 through line 23 to pump 24 which is driven by any suitable motivating means, not illustrated, and from which the liquid is discharged through line 25 into lines 26 and 27 which communicate, respectively, with zones 19 and 20. When desired pump 24 may be driven, from shaft 4 or otherwise, by the same motivating means, not shown, which drives shaft 4 and impeller 1. A pressure gauge 28 connected with the discharge side of the pump indicates the pressure at this point in the system and this pressure is maintained at a substantially constant value sufficiently greater than that employed in the mixing zone that liquid discharged from line 26 into zone 19 will be forced from the latter between member 15 and shaft 4 into the mixing zone, thus maintaining a positive flow of fluid along the surface of the shaft and preventing the seepage of corrosive fluid from the mixing zone along the shaft into the stuffing box.

In the case illustrated, a substantially constant pump discharge pressure of the desired value is maintained by providing a pressure regulating valve 29 in by-pass line 30, which connects line 25 with vessel 21. Any desired type of pressure regulating valve may be employed and, in the case illustrated, it is a diaphragm type valve in which pressure is transmitted from one of the pump discharge lines (line 27 in this particular instance) through conduit 31 to the under side of the diaphragm, which is spring-loaded on its opposite side. Thus, an increase in the discharge pressure of the pump above that for which valve 29 is set to operate will open the valve so that liquid is returned from the discharge side of the pump back to vessel 21 until the desired lower pressure is reestablished, whereupon valve 29 will close.

Vessel 21 is also provided, in the case illustrated with a pressure gauge 32, which indicates the pressure prevailing in this zone of the system, and is also provided with a safety valve 33 for releasing from the vessel any excess pressure which may be developed therein. It is, of course, within the scope of the invention to employ an open vessel in place of a closed vessel 21 or to operate vessel 21 at substantially atmospheric pressure, although superatmospheric pressure is generally preferred in this zone, particularly when the fluid stored therein is gaseous under atmospheric conditions.

When desired, and particularly in case the fluid supplied through line 26 and zone 19 to the mixing zone is one of the reactants or a mixture of reactants, its quantity is measured so that the proportional relationship between the reactants undergoing treatment may be maintained at the desired value. This may be accomplished, for example, by an indicating or recording flow meter of any suitable type, not illustrated, and in this particular instance an orifice plate 34 is provided between flanges 35 in line 26 with connections 37 and 38 on the downstream and upstream sides of the orifice plate leading to the flow meter.

The fluid supplied from line 27 to zone 20 flows along shaft 4 past member 16 into the zone 39 provided between member 16 and the packing and is returned from this zone through line 40 to vessel 21. By maintaining a substantially lower pressure in vessel 21 and in zone 39 than that employed in the mixing zone, the packing 10 is subjected only to this relatively low pressure, which is a distinct advantage when high superatmospheric pressure is employed in the mixing zone. To maintain reduced pressure in zone 39 and vessel 21 and still insure positive and continuous flow of the fluid from zone 19 into the mixing zone and from zone 20 into zone 39 and back from vessel 21, the pressure breakdown member 16 is designed to give a greater pressure drop than member 15. This may be accomplished by fitting it more closely to the shaft than member 15 or by making it longer than member 15 with substantially the same fit.

In case the fluids undergoing reaction in the mixing zone are at relatively high temperature, the fluid supplied, as previously described, from vessel 21 may also serve as a cooling fluid for shaft 4, packing 10 and members 15, 16, 17 and 18 by maintaining the temperature of the vessel 21 at a sufficiently low level. This is accomplished, in the case illustrated, by the cooling fluid circulated through coil 32, but it is also within the scope of the invention, when desired, to cool the fluid in any other suitable manner, not illustrated, such as, for example, by jacketing vessel 21 and circulating a cooling fluid through the jacket or by providing a cooling coil in line 40 or in line 23.

Since the fluid supplied through line 26 to zone 19 is directed therefrom into the mixing zone and is not returned to vessel 21 there will be a loss of this fluid from the circuit as the operation progresses. This loss usually is relatively small and vessel 21 may, when desired, be of sufficient size to act as a supply tank and retain sufficient fluid for relatively prolonged operation of the process. Otherwise, additional fluid may be periodically supplied to the system from any convenient bulk supply, not illustrated, through line 41 and valve 42 communicating with the pump suction line 23. Line 41 and valve 42 may also be employed as a means of charging vessel 21 with the desired quantity of fluid prior to operation of the process and pump 24 may be used as the charging pump by closing valve 45 in line 23 and valves 43 and 44 in the respective lines 27 and 26, so that valve 29 in line 30 will open to admit the fluid discharge from the pump to tank 21.

The apparatus is, of course, constructed of materials capable of withstanding the conditions of service to which they are subjected. These materials may be selected to suit requirements and except for specific instances are not considered a novel part of the invention. However, as applied to the alkylation process employing hydrogen fluoride, for example, or as applied to any process utilizing a reagent or catalyst of an acidic nature or highly corrosive to most of the common metals, I specifically contemplate the use of carbon in solid graphitic form or impregnated with graphite for member 15. Member 16 may be constructed of the same material, although this is not necessary due to the non-corrosive nature of the fluid with which this member comes in contact, permitting it as well as members 17 and 18 to be constructed of any desired metal or alloy which will not cause galling or cutting of the shaft when closely fitted thereto.

As an example of one specific operation of the apparatus herein provided and of the relatively severe conditions under which it will function, we will consider a fairly typical process for alkylating iso-butane with butenes employing hydrogen fluoride as the catalyst or alkylating agent. Impeller 1 of the apparatus illustrated is mounted within a reaction and mixing zone to which the hydrogen fluoride employed and a major portion of the total reactants are supplied by well known means, not illustrated, and thoroughly commingled by the operation of impeller 1. The mixing and reaction zone is operated at a superatmospheric pressure of about 175 pounds per square inch and a temperature of about 110° F. is maintained in this zone. Vessel 21 is charged with a mixture of the iso-butane and butenes to be reacted and is operated at a gauge pressure of approximately 100 pounds. A superatmospheric pressure of approximately 200 pounds per square inch is maintained on the discharge side of pump 24 and in zones 19 and 20 and a pressure drop of approximately 25 pounds is encountered by the stream of cooling and flushing liquid which flows from zone 19 about shaft 4 past the pressure breakdown member 15. A pressure drop of approximately 125 pounds is encountered by the cooling and flushing fluid flowing from zone 20 along shaft 4 past the pressure break-down member 16. The temperature maintained in vessel 21 is approximately 90° F. Thus, packing 10 operates at relatively low temperature and against only about 100 pounds gauge pressure and the stuffing box and its appurtenances, as well as the packing itself, are protected from contact with the corrosive mixture undergoing treatment in the reaction zone.

I claim as my invention:

In an apparatus of the class described, a stuffing box, a shaft extending through said stuffing box, packing means for the shaft disposed about the latter within said stuffing box adjacent its outer end, a pressure breakdown member disposed about the shaft adjacent the opposite end of the stuffing box, a second pressure breakdown member disposed intermediate the packing means and the first named pressure breakdown member, a space being provided within the stuffing box between said pressure breakdown members, partitioning means dividing said space into a zone disposed adjacent the first named pressure breakdown member and a separate zone disposed adjacent said second pressure breakdown member, another space being provided between the packing means and said second pressure breakdown member, said partitioning means being closely fitted to the shaft and the inner surface of the stuffing box to form a closure between said zones, and means for supplying fluid to each of said separate zones under pressure to force liquid outwardly from the first named zone between the shaft and the first named pressure breakdown member and from the other zone past said second pressure breakdown member and the shaft into said space adjacent the packing means.

LYMAN C. HUFF.